United States Patent [19]

Van Roessel

[11] 4,032,974

[45] June 28, 1977

[54] VIDEO PROCESSING CIRCUIT

[75] Inventor: Frederik Johannes Van Roessel, Upper Saddle River, N.J.

[73] Assignee: North American Philips Corporation, New York, N.Y.

[22] Filed: Oct. 20, 1975

[21] Appl. No.: 623,591

[52] U.S. Cl. .............................. 358/186; 358/148; 358/160; 333/28 R
[51] Int. Cl.² ................... H04N 5/38; H04N 5/04; H04N 5/14
[58] Field of Search ....... 178/7.1, DIG. 1, DIG. 13, 178/69.5 R, 69.5 N, 69.5 DC, DIG. 29; 333/28 R; 325/308; 358/83, 148, 149, 160

[56] References Cited
UNITED STATES PATENTS

| | | | |
|---|---|---|---|
| 2,892,026 | 6/1959 | Hurford | 178/7.1 |
| 3,165,585 | 1/1965 | James | 178/69.5 DC |
| 3,337,688 | 8/1967 | Hiatt, Jr. | 178/69.5 TV |
| 3,571,508 | 3/1971 | Roessel | 178/7.1 |
| 3,588,338 | 6/1971 | Dishert | 178/7.1 |
| 3,651,248 | 3/1972 | Schneider | 178/7.1 X |
| 3,655,913 | 4/1972 | Schneider | 178/69.5 DC |
| 3,676,587 | 7/1972 | Kline | 178/7.1 X |
| 3,919,471 | 11/1975 | Spiessbach et al. | 178/7.1 |

*Primary Examiner*—Robert L. Richardson
*Assistant Examiner*—Aristotelis M. Psitos
*Attorney, Agent, or Firm*—Frank R. Trifari; Henry I. Steckler

[57] ABSTRACT

A video processing circuit features direct current coupled circuits. This reduces streaking errors and lowers the power dissipation required.

7 Claims, 1 Drawing Figure

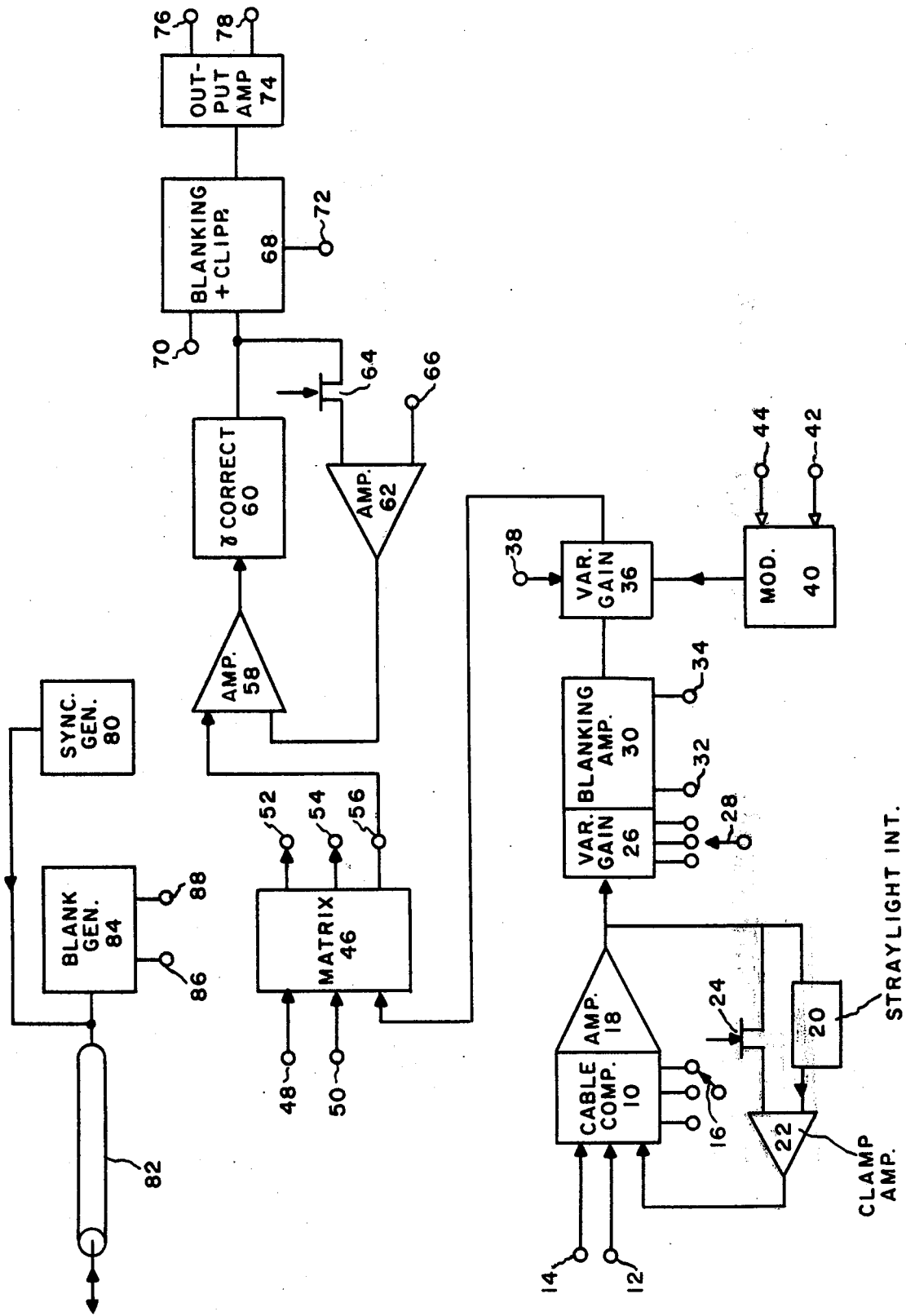

VIDEO PROCESSING CIRCUIT

The present invention relates to video processing circuits, and more particularly those that are used in television cameras.

In such circuits it is typical that AC coupling is used. This leads to several problems. More circuitry is required since the video signal must constantly be clamped. The clamps can themselves introduce streaking errors and offset voltages. In some circuits, such as gamma correction and blanking circuits, it is desirable to have diodes in feedback loops. However, these diodes cause rectification of voltages that are then impressed on coupling capacitors. Since multiple feedback loops are required, inverting amplifiers must be used with their inverting inputs at virtual ground to prevent interreaction among the loops. If AC coupling is used, then the absolute value of a working point varies which requires a large dynamic range for that stage, and dissipates a large amount of power.

It is therefore an object of the present invention to reduce the amount of circuitry in video processing circuits.

It is another object to reduce offset voltages.

It is a further object to reduce low frequency distortion such as streaking.

It is a still further object to reduce power consumption and the required dynamic range of stages.

In brief, these and other objects are achieved by a cable compensation circuit and a straylight compensation and clamping circuit coupled to said cable compensation circuit. Then a blanking amplifier a matrix, and a gamma correction and clamping circuit are serially direct current coupled to each other and to said cable compensation circuit.

Other objects, features, and advantages will become apparent from the following description when taken in conjunction with the drawing in which:

The sole FIGURE is a block diagram of the invention.

The figure shows the circuitry for the blue channel which has a cable compensating circuit 10 that receives at input 12 a white positive video signal from the preamplifier at the camera head through a cable. The input 14 receives a black shading signal from a black shading generator (not shown). A switch 16 applies a voltage to circuit 10 to select the degree of compensation in accordance with the cable length. An inverting amplifier 18 is coupled to the output of compensation circuit 10. Straylight integrator 20, clamp amplifier 22, and transistor 24, which receives a clamping pulse at its gate, correct for straylight and clamp the DC level as set forth in application Ser. No. 564,732, filed Apr. 3, 1975, now abandoned in favor of continuation application Ser. No. 589,765, filed June 24, 1975, now U.S. Pat. No. 4,001,502. The black level is set to zero volts.

The variable gain stage 26 is DC coupled to amplifier 18 and has its gain varied by switch 28. Different gains are required during initial camera setup and for normal and low light level scenes. Blanking amplifier 30 is an inverting amplifier with multiple non-linear feedback, and it is DC coupled to variable gain stage 26. It blanks the signal with the output having a black level at zero volts, which stays constant even if the gains are switched. Inputs 32 and 34 receive the camera tube and a test sawtooth blanking signals respectively.

The variable gain stage 36 is DC coupled to the blanking amplifier 30 and is a true inverting multiplier whose gain is controlled by a DC voltage from control voltage modulator 40. Input 38 can receive a test sawtooth signal. State 36 has a negative output signal. Modulator 40 receives a blue gain and vertical drive signals at inputs 42 and 44. It applies signals to stage 36 so as to correct the vertical shading. This is done by integrating the control voltage, which is periodically reset by the vertical drive signal. Because stage 36 is a true multiplier, it is possible to modulate the control voltage with the shading correction signal.

Matrix circuit 46 performs color correction and is DC coupled to stage 36, and through inputs 48 and 50 it is also coupled to the red and green channels respectively. Outputs 52 and 54 are applied to said respective channels. All outputs 52, 54, and 56 have positive signals. Output 56 is DC coupled to inverting amplifier 58, which applies the video signal to inverting gamma correction amplifier circuit 60. This circuit can switch between two different gammas or no correction at all. Offset voltages are corrected by clamping amplifier 62 and transistor 64, which receives a clamping pulse at its gate. The black level is controlled by varying the voltage applied to terminal 66.

Blanking and clipping amplifier 68 is an inverting amplifier with multiple non-linear feedback and again blanks the signal in accordance with a blanking signal applied to terminal 72. It also clips at the black and white levels and adds a contour or aperture correction signal, applied to terminal 70 and preferably derived from the green channel as described in U.S. Pat. No. 3,732,360. The output amplifier 74 is DC coupled to stage 68 and again inverts the signal. It has DC restored outputs 76 and 78 that go to the encoder and monitor respectively.

The red channel is identical to the blue one described above. The green channel is identical except that the variable gain stage 36 is replaced by an inverting amplifier, whose output is coupled to terminal 50. The amplitude of the signal in the green channel is controlled by the iris setting; the input of the contour correction circuit is derived from the output of the blanking amplifier 30 in the green channel.

The figure also shows a synchronization generator 80 that generates horizontal drive and camera tube blanking pulses, adds them together, and sends them over coaxial cable 82 to the camera head. At the head these pulses are separated and then applied to the appropriate circuits in the head. Since cable 82 is not terminated, the pulses will also be reflected and stripped in blanking generator 84. The clamping and blanking pulses are then available at terminals 86 and 88 respectively. They will always be in time with the video signal at terminal 12 regardless of the cable length. This is important to achieve a correct and a stable black level from amplifier 18 regardless of cable length.

It will be appreciated that many other embodiments are possible without departing from the spirit and scope of the invention.

I claim:

1. A video processing circuit comprising a cable compensating circuit having a first input means for receiving a video signal, a second input means, and an output, a straylight compensation and clamping circuit having an input coupled to said cable compensation circuit output and an output coupled to said cable compensation circuit second input means, a blanking amplifier having an input direct current coupled to said cable compensating circuit output and an output, a matrix circuit having an input direct current coupled to said blanking amplifier output and an ouput, and a gamma correction and clamping circuit having an input direct current coupled to said matrix circuit output and an output.

2. A circuit as claimed in claim 1 wherein said blanking amplifier comprises a variable gain input.

3. A circuit as claimed in claim 1 wherein said cable compensation circuit comprises an inverting output amplifier.

4. A circuit as claimed in claim 1 further comprising a variable gain amplifier having an input direct current coupled between said blanking amplifier and said matrix.

5. A circuit as claimed in claim 4 further comprising a blanking and blank and white peak clipping circuit coupled to said gamma correction and clamping circuit output.

6. A circuit as claimed in claim 1, further comprising means for transmitting a clamping pulse over an unmatched cable from said video processing circuit to a camera head, whereby a portion of said signal is reflected to said processing circuit, and means for receiving the reflected clamping pulse and for applying it to said straylight compensation and clamping circuit, whereby said reflected and received clamping pulse is in time synchronization with said video signal transmitted from said camera head to said video processing circuit.

7. A circuit comprising means for transmitting a first signal from a first station to a second station over an unmatched transmission line, whereby a portion of said signal is reflected to said first station, and means for receiving the reflected first signal at said first station, whereby said received and reflected first signal is in time synchronization with a second signal transmitted from said second station to said first station.

* * * * *

Disclaimer 4,032,974.—*Frederik Johannes Van Roessel*, Upper Saddle River, N.J. VIDEO PROCESSING CIRCUIT. Patent dated June 28, 1977. Disclaimer filed Sept. 8, 1980, by the assignee, *North America Philips Corporation*.
Hereby enters this disclaimer to claim 7 of said patent.

[*Official Gazette December 23, 1980*]